United States Patent [19]

Westover

[11] 3,981,512

[45] Sept. 21, 1976

[54] REAR WHEEL STEERING SYSTEM

[76] Inventor: Marvin D. Westover, Rte. No. 1, Amoret, Mo. 64722

[22] Filed: Mar. 24, 1975

[21] Appl. No.: 561,157

[52] U.S. Cl............................ 280/81.5; 280/DIG. 9
[51] Int. Cl.².......................................... B62D 53/00
[58] Field of Search .............. 280/81 B, 81 R, 81.5, 280/DIG. 9, 442; 180/79.2 B

[56] References Cited
UNITED STATES PATENTS

| | | | |
|---|---|---|---|
| 2,532,151 | 11/1950 | Dibert............................ | 280/DIG. 9 |
| 2,710,198 | 6/1955 | Hall .................................. | 280/81.5 |
| 2,743,116 | 4/1956 | Morrell........................... | 280/81.5 X |
| 3,048,422 | 8/1962 | Payne .............................. | 280/81.5 |
| 3,454,123 | 7/1969 | Lewis.............................. | 280/81.5 X |
| 3,733,084 | 5/1973 | Mauck.............................. | 280/81.5 |
| 3,873,129 | 3/1975 | Schmidt..................... | 280/DIG. 9 X |

*Primary Examiner*—M. H. Wood, Jr.
*Assistant Examiner*—Terrance L. Siemens
*Attorney, Agent, or Firm*—Fishburn, Gold & Litman

[57] ABSTRACT

A rear wheel steering system for trailers operative to permit selective steering of the rear of a trailer by swinging a rear wheel and axle assembly relative to a trailer frame and independently of the steering of a towing vehicle. The system includes extensible members each having respective opposite ends thereof pivotally connected to a frame of the trailer and to a mounting member having the rear wheels and axle assemblies mounted thereon and operative to selectively turn the mounting member and wheels and axle assemblies thereon relative to the frame of the trailer for steering of the rear end thereof.

4 Claims, 8 Drawing Figures

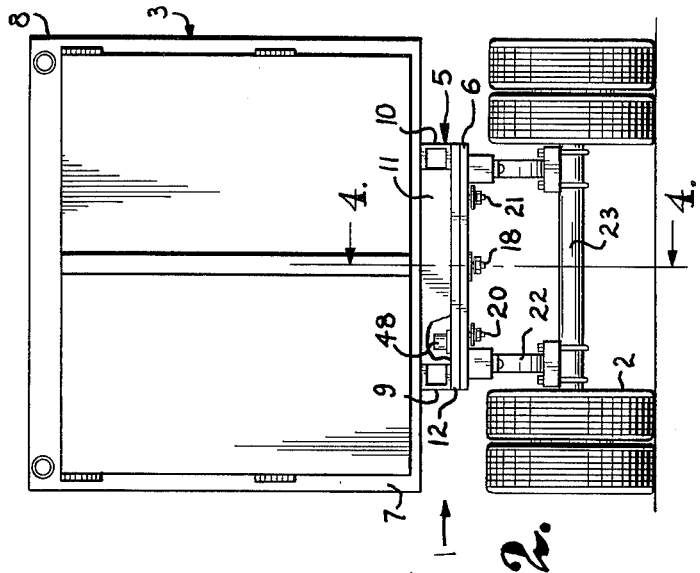
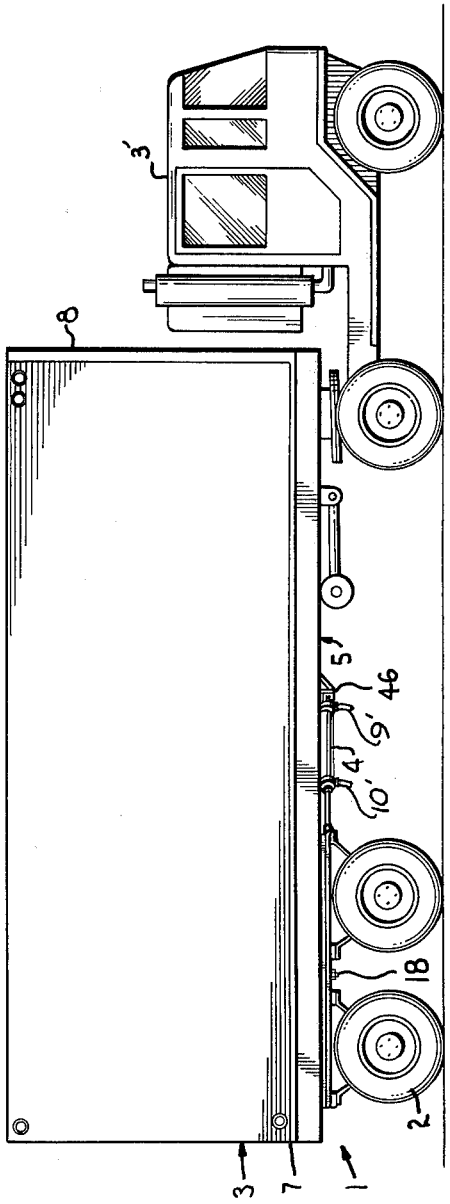
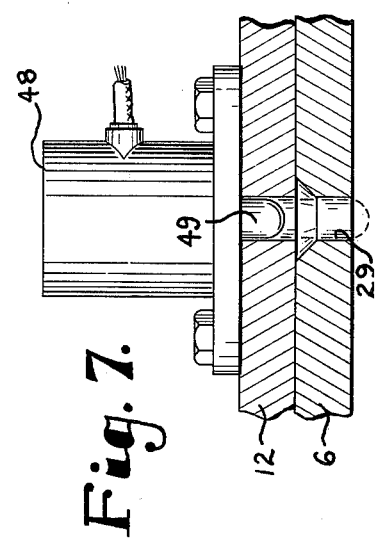
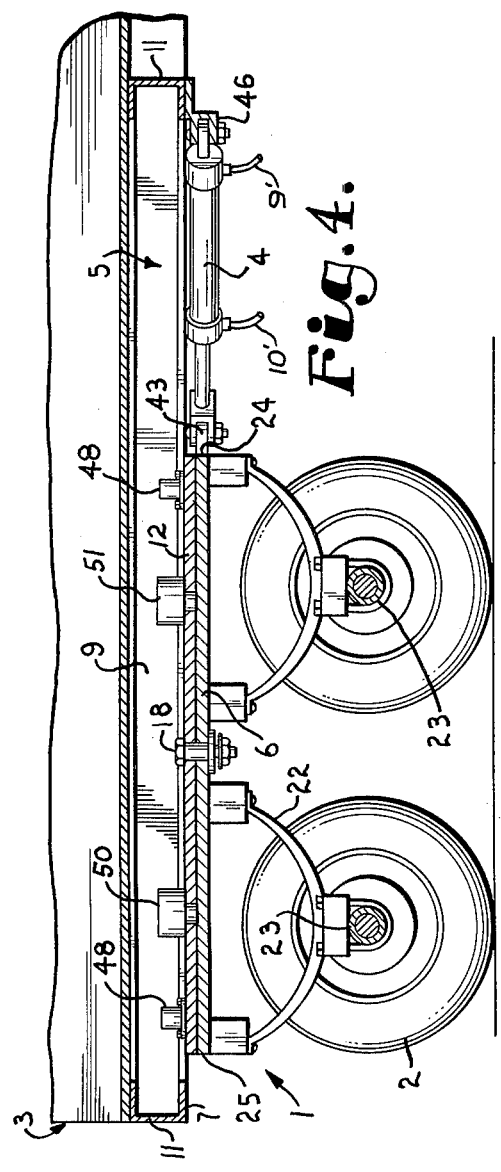

U.S. Patent  Sept. 21, 1976  Sheet 2 of 2  3,981,512
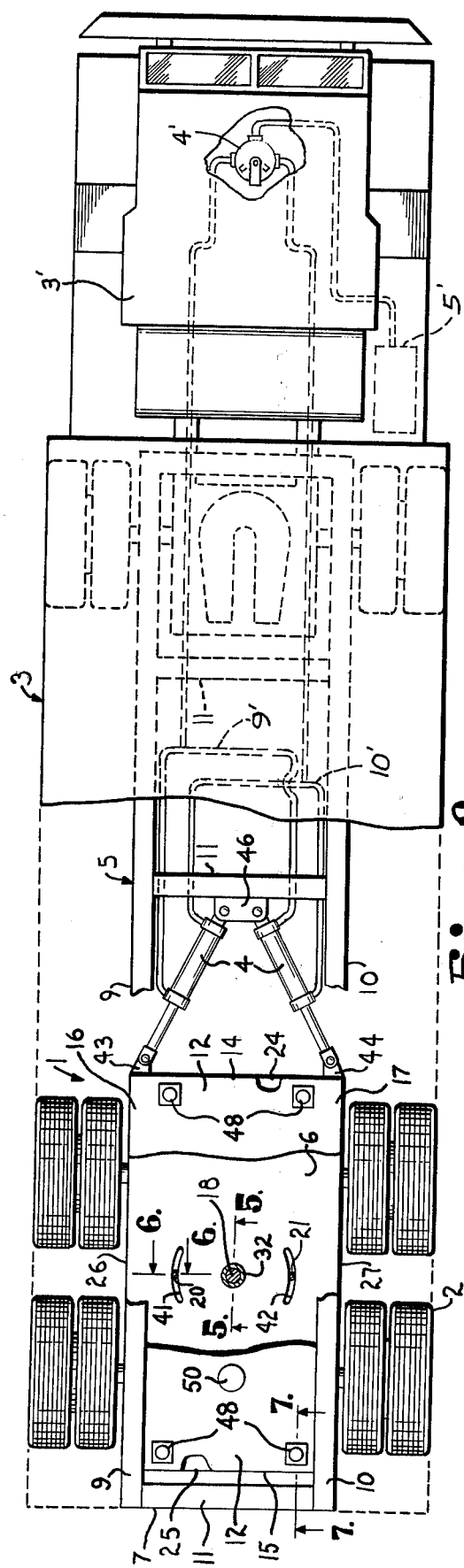
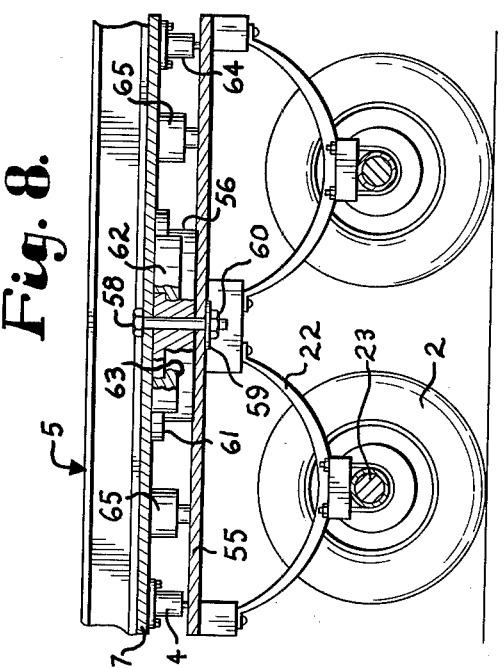
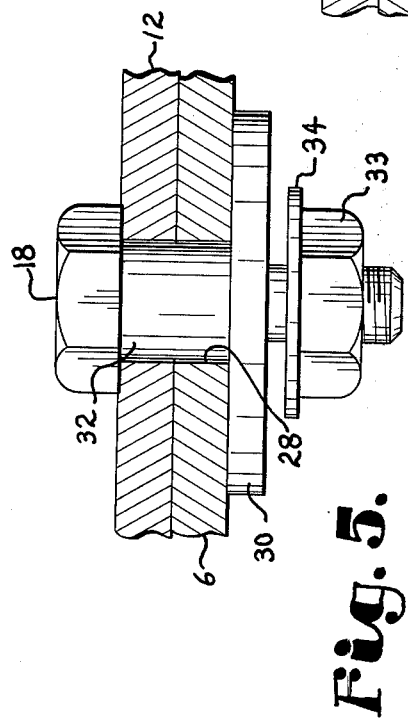

REAR WHEEL STEERING SYSTEM

The present invention relates to a rear wheel steering system for trailers and more particularly to such a rear wheel steering system operative to permit selective steering of the rear wheels of a trailer independently of steering of a towing vehicle.

The principal objects of the present invention are: to provide a rear wheel steering system operative to permit selective steering of the rear wheels and axle assembly of a trailer independent of steering of a towing vehicle; to provide such a rear wheel steering system including components particularly adapted for slow speed maneuvering of a rear end of a trailer in yards, in alleys, adjacent loading docks, and the like; to provide such a rear wheel steering system including members adapted to retain a rear wheel and axle assembly locked in a straight away position for highway travel; to provide such a rear wheel steering system including scales to permit weighing of the load on the rear end wheel and axle assembly of a trailer; to provide such as rear wheel steering system including means for lubricating moving components thereof; and to provide such a rear wheel steering system which is economical to manufacture, durable in construction, positive in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment of the present invention and illustrate various objects and features of the rear wheel steering system.

FIG. 1 is a side elevational view of a trailer having a rear wheel steering system embodying features of the present invention.

FIG. 2 is an end elevational view of a rear end of the trailer and rear wheel steering system.

FIG. 3 is a top plan view of the rear wheel steering system with portions broken away to better illustrate the components thereof.

FIG. 4 is a longitudinal sectional view taken on line 4—4 of FIG. 2.

FIG. 5 is an enlarged fragmentary sectional view taken on line 5—5 of FIG. 3 and showing a pivot pin and mounting thereof.

FIG. 6 is an enlarged fragmentary sectional view taken on line 6—6 of FIG. 3 and showing a guide pin and a guide way.

FIG. 7 is an enlarged fragmentary sectional view taken on line 7—7 of FIG. 3 and showing a locking member.

FIG. 8 is a enlarged fragmentary sectional view showing a modified means for mounting a pivot pin.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 generally designates a rear wheel steering system operative to permit selective steering of rear wheels 2 of a trailer 3 independently of the steering of a towing vehicle 3' connected thereto. The rear wheel steering system 1 includes at least one extensible member 4 having respective opposite ends thereof pivotally connected to a frame 5 of the trailer 3 and to a mounting member 6 having the rear wheels 2 mounted thereon and operative to selectively bodily turn the mounting member 6 and the wheels 2 thereon relative to the trailer frame 5 for steering of a rear end 7 of the trailer 3.

The trailer frame 5 may be any suitable structure adapted to support a trailer body 8 of any conventional structure. The frame 5 is illustrated as having a pair of laterally spaced side members 9 and 10 which are equally spaced from a longitudinal axis of the frame 5. The frame 5 includes a plurality of longitudinally spaced bracing members 11 extending transversely between and connected to the side members 9 and 10.

The rear wheel steering system 1 includes a frame member 12 suitably mounted on the trailer frame 5, as by welding to the side members 9 and 10. The frame member 12 may be any desired shape, however, the frame member 12 is illustrated as a rectangular elongated planar member having leading and trailing edge portions 14 and 15 and opposite side edge portions 16 and 17.

A pivot pin 18 is positioned at an intersection of the longitudinal axis and transverse axis of the frame member 12, for a purpose later described.

A pair of guide pins 20 and 21 are positioned on the transverse axis of the frame member 12 and are equally spaced from the pivot pin 18 mounted thereon.

A rear wheel assembly includes the mounting member 6 which has at least one pair of springs 22 mounted thereon and depending therefrom. An axle 23 extends between and has opposite end portions thereof connected to the rear springs 22. The rear wheels 2 are mounted on the axle 23 in a conventional manner. The rear wheel assembly illustrated in a steerable tandem axle assembly with each axle being connected to respective springs.

The mounting member 6 may be any desired shape, such as an elongated rectangular planar member having leading and trailing end portions 24 and 25 and opposite edge portions 26 and 27. The mounting member 6 has a center aperture 28 positioned at an intersection of a longitudinal and transverse axis of the mounting member 6. The center aperture 28 is adapted to receive the pivot pin 18, as later described.

The mounting member 6 has a plurality of spaced apertures 29 in respective edge portions thereof. In the illustrated structure, the edge apertures 29 are in the leading and trailing edge portions 24 and 25 and are positioned adjacent the opposite side edge portions 26 and 27 or at the corners of the mounting member 6.

The rear wheel and axle assembly turns around the pivot pin 18 and is suitably connected thereto. The illustrated connection of the mounting member 6 to the pivot pin 18 includes a suitable stiffening plate 30 mounted on a lower surface of the mounting member 6. A bushing 32 is sleeved on and surrounds the pivot pin 18 with opposite ends of the bushing 32 in engagement with the stiffening plate 30 and a head of the pin 18. The pivot pin 18 extends through the center aperture 28 in the mounting member 6 and has a lower end portion thereof threaded to receive a suitable nut 33 and washer 34 thereon. The washer 34 is positioned to be slightly spaced from a lower surface of the mounting member 6 to permit free turning of the rear wheel and axle assembly relative to the mounting member 12.

It is desirable to restrict or limit tilting of the mounting member 6 of the rear wheel assembly relative to the trailer frame 5, therefore, the pins 20 and 21 each have an arcuate plate 35 mounted thereon. The plates 35 are adapted to engage the lower surface of the mounting member 6.

Lower ends of the pins 20 and 21 are threaded to receive a suitable washer 36 and nut 37 which are adapted to support the respective plate 35 in spaced relation below the lower surface of the mounting member 6.

The mounting member 6 has a pair of arcuate guideways 41 and 42 thereon and the guideways are equally spaced from the center aperture 28. The arcuate guideways 41 and 42 are adapted to receive the pins 20 and 21 respectively. The arcuate lower plates 35 are then mounted on the pins 20 and 21 and supported in spaced relation with the lower surface of the mounting member 6 by tightening the nuts 37 to permit free turning of the rear wheel assembly relative to the frame member 12.

The mounting member 6 has a pair of ears 43 and 44 extending forwardly from the leading edge portion 24 thereof. The ears 43 and 44 are positioned adjacent side edge portions 26 and 27 and adapted to have one end of a respective one of the extensible members 4 pivotally connected thereto.

The extensible members 4 are preferably a pair of air cylinders each having one end thereof pivotally connected to the ears 43 and 44 on the mounting member 6 and the other end thereof pivotally connected to the trailer frame 5.

In the illustrated structure, an ear or bracket 46 is mounted on the trailer frame 5 and pivotally supports the other end of each of the extensible members 4.

The extensible members 4 are each operatively connected by conduits 9' and 10' through a suitable three-position valve 4' located in a cab of a tractor or other towing vehicle 3' to a suitable air tank 5'. The valve preferably has a neutral position for road travel.

It is desirable to retain the rear wheel and axle assembly against turning during road travel, therefore, a plurality of lock members 48 are mounted on the frame member 12. The lock members 48 each have a lock pin 49 depending therefrom and extending downwardly through the frame member 12 and a respective aligned aperture 29 in the mounting member 6. The lock members 48 each include a suitable resilient member (not shown) adapted to urge the respective lock pins 49 to the extended position in the apertures 29.

A suitable switch (not shown) is positioned in the cab and adapted to complete a suitable circuit to the lock members 48 and effect retraction of the lock pins 49 to permit turning of the mounting member 6 and the wheels 2 thereon, as by control of the extensible members 4.

It is desirable to determine the weight applied to the rear wheels 2 to demonstrate compliance with governmental regulations, therefore, a pair of scales 50 and 51 have operative parts thereof positioned between the frame member 12 and the mounting member 6 with the scales being operatively connected to a suitable instrument within the cab of the tractor. The scales 50 and 51 may be hydraulic, air, or electronically operated. The scales 50 and 51 are preferably positioned on the longitudinal axis of the frame member 12 and preferably each have a portion thereof retained in suitable recesses in the upper surface of the mounting member 6.

During travel of the trailer 3 and towing vehicle 3' on the road the lock pins 49 are resiliently maintained in the edge apertures 29 of the mounting member 6. When it is desired to maneuver the rear end 7 of the trailer 3 independently of normal steering by the cab or tractor, the lock members 48 are actuated to retract the lock pins 49. The extensible members 4 are then selectively activated to turn the rear wheel mounting assembly about the pivot pin 18. Maneuvering of the trailer 3, as by movement by the towing vehicle or prime mover is thereby facilitated steering of the rear wheels 2 under control of the operator. The pins 20 and 21 move in the guideways 41 and 42 respectively in the mounting member 6.

Lubrication to engaging surfaces of the rear wheels steering system 1 is provided by suitable fittings mounted on the side edge portions 16 and 17 of the frame member 12 and suitable tubes extend from the fittings to the respective lubrication points.

FIG. 8 illustrates a modified means for mounting the rear wheel and axle assembly. A mounting member 55 has the springs 22, axles 23, and wheels 2 mounted thereon in a manner similar to the mounting of same on the mounting member 6 illustrated in FIGS. 1 to 4 inclusive.

The modified mounting member 55 has a generally cylindrical support portion 56 mounted thereon and extending upwardly from an upper surface thereof. The support portion 56 has an upper end in engagement with a modified frame member 57. An elongated pivot pin 58 extends through the frame member 57, support portion 56, and mounting member 55. The pivot pin 58 has a washer 59 retained in engagement with the lower surface of the mounting member 55 by a nut 60.

It is desirable to provide interengaging means on the support portion 56 and the frame member 57 for retaining the rear wheel and axle assembly in supported engagement with the frame member 57. In the illustrated structure, the support portion 56 has an enlarged upper end defined by a flange 61 extending radially outwardly from the exterior surface of the upstanding support portion 56. A retaining member 62 depends from the frame member 57 and is in engagement with the flange 61. The retaining member 62 may be secured to the frame member 57 or removably mounted thereon as desired. The retaining member 62 has an inwardly directed flange portion 63 positioned below and in engagement with a lower surface of the flange 61 thereby providing a guide for movement of the support portion 56 during turning of the rear wheel and axle assembly.

The structure illustrated in FIG. 8 includes suitable lock members 64 positioned between the mounting member 55 and the frame member 57. The lock members 64 each have a pin depending therefrom and extendable into an aperture in the mounting member 55 similar to the aperture 29 illustrated in FIG. 7.

Suitable scales 65 may also be positioned between the mounting member 55 and the frame member 57. The scales 65 are operative to determine weight applied to the rear wheels 2.

It is to be understood that while I have illustrated and described certain forms of my invention, it is not to be limited to these specific forms or arrangement of parts herein described and shown.

What I claim and desire to secure by Letters Patent is:

1. In a tractor-trailer combination:
   a. a towing vehicle;
   b. a trailer having a forward end adapted to be pivotally connected to said towing vehicle, said trailer having an elongated frame with a pair of spaced longitudinally extending side members connected by a plurality of longitudinally spaced transverse cross members;
   c. a frame member fixed on the trailer frame adjacent a rear end thereof and extending under each of the trailer frame side members, said frame member having a downwardly facing bearing surface;
   d. a rear wheel assembly having a mounting member with load carrying axles having rotatable ground engaging wheels, said mounting member being resiliently supported by said axles, said mounting member being under said frame member and having an upwardly facing bearing surface engaging the downwardly facing bearing surface of said frame member;
   e. means on said frame member and mounting member pivotally connecting same together for rotative movement of said mounting member on a vertical axis centrally of the rear wheel assembly and on a longitudinal center of the trailer frame;
   f. laterally spaced fluid actuated extensible members each having one end pivotally connected to a leading portion of the mounting member and the other end pivotally connected to the frame of the trailer forwardly of said mounting member and extension of one and contraction of the other extensible members operates to rotate the rear wheel assembly about said vertical axis;
   g. said mounting member having lock recesses each substantially spaced outwardly from said vertical axis;
   h. lock structures on the frame member and an end having a lock tongue registering with a respective lock recess when the rear wheel assembly is in position for movement of the trailer in a straight longitudinal line and normally engaged in said lock recesses to retain the rear wheel assembly in said position;
   i. means controlled from within the towing vehicle and operative to simultaneously release the lock tongues from the lock recesses to permit turning of the rear wheel assembly about said vertical axis; and
   j. means controlled from within the towing vehicle and operative to selectively apply fluid pressure to said pair of extensible members to turn the rear wheel assembly about said vertical axis for steering the rear end of the trailer.

2. A tractor-trailer combination as set forth in claim 1 and including:
   a. a pair of arcuate guideways in one of said mounting member and said frame member with each guideway at a radius from said vertical axis; and
   b. a pair of pins fixed to and extending from the other of said mounting member and frame member and each received in a respective one of said arcuate guideways and cooperative with said means pivotally connecting the mounting member and frame member.

3. In a tractor-trailer combination as set forth in claim 1 wherein said means on said frame member and on said mounting member for pivotally connecting same together comprises:
   a. support portion mounted on said mounting member and having an upper surface thereof in engagement with a downwardly facing surface of said frame member said surfaces being the engaged bearing surfaces of the mounting member and frame member;
   b. an elongated pivot pin extending through said frame member and said support portion and said mounting member; and
   c. interengaging means mounted on said support portion and on said frame member for retaining said support portion in engagement with said frame member.

4. In a tractor-trailer combination as set forth in claim 3 wherein said interengaging means includes:
   a. a flange extending radially outwardly from said support portion and having an lower surface; and
   b. a retaining member depending from said frame member and having an inwardly directed flange portion below and in engagement with the lower surface of said flange of said support portion.

* * * * *